(12) United States Patent
Dhillon et al.

(10) Patent No.: US 6,560,597 B1
(45) Date of Patent: May 6, 2003

(54) CONCEPT DECOMPOSITION USING CLUSTERING

(75) Inventors: Inderjit Singh Dhillon, Austin, TX (US); Dharmendra Shantilal Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/528,941

(22) Filed: Mar. 21, 2000

(51) Int. Cl.[7] ............................................... G06F 17/30
(52) U.S. Cl. ................................. 707/4; 707/6; 707/102
(58) Field of Search ............................ 707/4, 5, 3, 102, 707/6; 709/201

(56) References Cited

U.S. PATENT DOCUMENTS

| | | | |
|---|---|---|---|
| 4,674,028 A | 6/1987 | Shioya et al. ................. 700/52 |
| 5,317,507 A | 5/1994 | Gallant ....................... 707/532 |
| 5,692,100 A | 11/1997 | Tsuboka et al. ............ 704/222 |
| 5,692,107 A | 11/1997 | Simoudis et al. ............. 706/12 |
| 5,748,116 A | 5/1998 | Chui et al. .................... 341/50 |
| 5,787,274 A | 7/1998 | Agrawal et al. ............ 707/102 |
| 5,787,422 A | * 7/1998 | Turkey et al. .................. 707/5 |
| 5,794,235 A | 8/1998 | Chess ............................ 707/5 |
| 5,886,651 A | 3/1999 | Chui et al. .................... 341/50 |
| 5,893,100 A | 4/1999 | Chui et al. .................. 707/100 |
| 5,999,927 A | * 12/1999 | Turkey et al. .................. 707/5 |
| 6,356,898 B2 | * 3/2002 | Cohen et al. ................... 707/5 |
| 6,360,227 B1 | * 3/2002 | Aggarwal et al. .......... 707/102 |

OTHER PUBLICATIONS

Drineas et al., "Clustering in large graphs and matrices," *SODA* pp. 291–299 (1999).
Duda et al., "Pattern Classification and Scene Analysis," John Wiley & Sons pp. 211–228 and pp. 252–256 (1973).
Kleinberg et al., "A Microeconomic View of Data Mining," Department of Computer Science, Cornell University pp. 1–14 (1998).
Sahami et al., Real–time Full–text Clustering of Networked Documents, Stanford University, pp. 1–3 (1998).

* cited by examiner

*Primary Examiner*—Diane D. Mizrahi
(74) *Attorney, Agent, or Firm*—David A. Hall; Heller Ehrman White & McAuliffe

(57) ABSTRACT

A system and method operates with a document collection in which documents are represented as normalized document vectors. The document vector space is partitioned into a set of disjoint clusters and a concept vector is computed for each partition, the concept vector comprising the mean vector of all the documents in each partition. Documents are then reassigned to the cluster having their closest concept vector, and a new set of concept vectors for the new partitioning is computed. From an initial partitioning, the concept vectors are iteratively calculated to a stopping threshold value, leaving a concept vector subspace of the document vectors. The documents can then be projected onto the concept vector subspace to be represented as a linear combination of the concept vectors, thereby reducing the dimensionality of the document space. A search query can be received for the content of text documents and a search can then be performed on the projected document vectors to identify text documents that correspond to the search query.

27 Claims, 6 Drawing Sheets

CONCEPT DECOMPOSITION USING CLUSTERING

BACKGROUND OF THE INVENTION

1. Field of the Invention

This invention relates generally to computer document retrieval systems and, more particularly, to computer document content search and classification.

2. Description of the Related Art

Large sets of computer-readable text documents are now increasingly common. For example, the "World-Wide-Web" presently contains over 300 million pages and is growing rapidly. The Internet-based "Patent Server" document service of the International Business Machines Corporation ("IBM Corp.") includes more than 20 million patents. The database of the Lexis-Nexis division of Reed Elsevier, Inc. contains more than 1 billion documents. Furthermore, an immense amount of text data exists on private corporate intranets, in archives of media companies, and in scientific and technical publishing houses.

Applying efficient search techniques to such collections of text data is of great practical interest. Search engine websites on the Internet are among the most popular sites on the World Wide Web. The IBM Corp. Patent Server and the Lexis-Nexis system mentioned above both incorporate text search and retrieval mechanisms. Document search and retrieval systems are widely deployed within business organizations, typically accessible through corporate intranets. The search techniques being used for these systems include machine learning and statistical algorithms such as clustering, classification, principal component analysis, and discriminant analysis.

A starting point for applying such search techniques to unstructured text data is to create a vector space model for text data. This involves representing documents as vectors of the document words in a word-by-document matrix whose rows are words and columns are documents. Thus, a large collection of documents in a vector space representation can easily comprise a matrix with 100K×100K entries. One methodology for such representations is first (a) to extract unique content-bearing words from the set of documents and treat these words as features, and then (b) to represent each document as a vector of certain weighted word frequencies in this feature space. Typically, a large number of words exist in even a moderately sized set of documents—a few thousand words are common. Hence, the document vectors are very high-dimensional. Nevertheless, most individual documents contain many fewer words, from 1% to 5% of the words or less, in comparison to the total number of words in the entire document collection. Hence, the document vectors are very sparse. Understanding and exploiting the structure of such vector space models is a major contemporary scientific and technological challenge.

In a text search and retrieval context, it has been proposed to use latent semantic indexing (LSI), which uses truncated singular value decomposition (SVD) or principal component analysis to discover "latent" relationships between correlated words and documents. One may interpret LSI as a matrix approximation scheme. Based on earlier work for image compression, a memory efficient matrix approximation scheme known as semi-discrete decomposition has been developed. Others have used an "implicit" matrix approximation scheme based on context vectors. Still others have proposed computationally efficient matrix approximations based on random projections.

Clustering has been used to discover "latent concepts" in sets of unstructured text documents, and to summarize and label such collections. Various classical clustering algorithms are known, such as the "k-means" algorithm and its variants, hierarchical agglomerative clustering, and graph-theoretic methods. Clustering is a way of processing the vector space of a document collection to discover similar documents, based on the fact that documents related to similar topics tend to cluster in the document vector space. A categorization or classification of the documents can therefore take place through clustering techniques.

The k-means algorithm assumes that the document vectors have been normalized to have unit $L^2$ norm, that is, the documents can be thought of as points on a high-dimensional unit sphere. Such normalization mitigates the effect of differing lengths of documents. In this way, the document vectors should be differentiated solely on the basis of their word content. It is known to measure "similarity" between such vectors by the inner product between them. This measure is known as cosine similarity. The more closely located any two document vectors are to each other, the more closely related are the documents. The results of the k-means technique applied to a collection of documents can be valuable in locating desired documents and discovering latent content similarities. The processing involved, however, can require relatively large matrix operations. As noted above, the document vectors can easily comprise a database with upwards of 100K×100K matrix size.

From the discussion above, it should be apparent that there is a need for a text search and retrieval technique that more efficiently implements clustering to identify similar text documents in a collection. The present invention fulfills this need.

SUMMARY OF THE INVENTION

The present invention provides a system and method in which documents of a collection are represented as normalized document vectors of word frequencies. The document vector space is then partitioned into a set of disjoint clusters and a concept vector is computed for each partition, the concept vector comprising the normalized mean vector of all the documents in each partition. Documents are then reassigned to the cluster having their closest concept vector, and a new set of concept vectors for the new partitioning is computed. From an initial partitioning, the concept vectors are iteratively calculated to a stopping threshold value, leaving a concept vector subspace of the document vectors. The documents can then be projected onto the concept vector subspace to be represented as a linear combination of the concept vectors, thereby reducing the dimensionality of the document space. The reduced dimensionality provides more efficient representation of documents as linear combinations of concept vectors, and permits simpler document searching and categorization of the documents. In this way, the invention provides text search and retrieval technique that more efficiently implements clustering to identify similar text documents in a collection.

In one aspect of the invention, a disjoint clustering partition of the document vectors is computed, and a "normalized centroid" referred to as the concept vector is computed for each of these clusters. The cluster concept vectors are iteratively computed to a predetermined threshold, forming a set of concept vectors that define a vector subspace of the document vector space. Any document in the document vector space can then be represented as a linear combination in the concept vector subspace. The invention can exploit the sparsity of the text data, it can be efficiently parallelized, and converges quickly (to a local maxima). Moreover, from a statistical perspective, the invention generates concept vectors that serve as a "model" which may be used to classify future documents.

Other features and advantages of the present invention should be apparent from the following description of the preferred embodiments, which illustrate, by way of example, the principles of the invention.

DESCRIPTION OF THE PREFERRED EMBODIMENT

Figure 1:
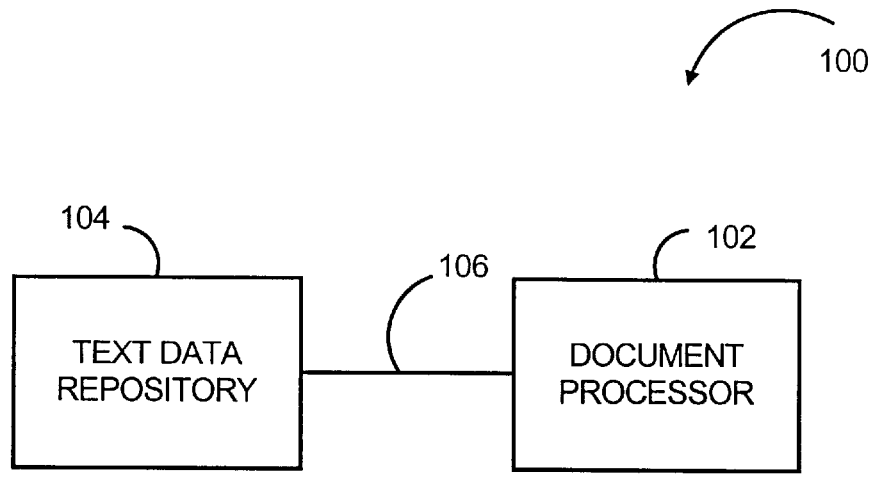
FIG. 1 is a representation of information flow in a computer processing system constructed in accordance with the present invention.

FIG. 1 is a representation of a system 100 that processes text documents in accordance with the invention. The system includes a document processor computer 102 that receives text data from a text data repository 104 over a link 106. The system 100 can be implemented as a single data processing machine, in which case the text data repository may be a data storage device and the link 106 may comprise a computer bus. Alternatively, the document processor 102 may be an independent computer or collection of computers, and the text data repository may be a remote data store. In such a configuration, the link 106 comprises a network connection, such as a local area network (LAN) or wide area network (WAN) or the like. The link 106 is preferably a high speed link, as the text documents to be processed can comprise thousands of documents with hundreds or thousands of pages of text in each document.

The text document data files from the repository 104 are received by the document processor 102 and are processed into vector representation. The document vector space is then partitioned into a set of disjoint clusters and a concept vector is computed for each partition, the concept vector comprising the mean vector of all the documents in each partition. The initial partition can be arbitrarily determined, such as by using a uniform distribution or random assignments. The document processor 102 reassigns each document vector to the cluster having the concept vector closest to the respective document vector, and then computes a new set of concept vectors for the new partitioning. That is, a new mean vector is computed for each newly determined partition or cluster. From an initial partitioning, the concept vectors are iteratively calculated to a stopping threshold value, leaving a concept vector subspace of the document vectors. After the concept subspace is computed, the documents are projected onto the concept vector subspace, to be represented as a linear combination of the concept vectors, thereby reducing the dimensionality of the document space. The reduced dimensionality provides more efficient representation of documents as linear combinations of document vectors, and permits simpler document searching and categorization of the documents. In this way, the invention provides text search and retrieval technique that more efficiently implements clustering to identify similar text documents in a collection.

Figure 2:
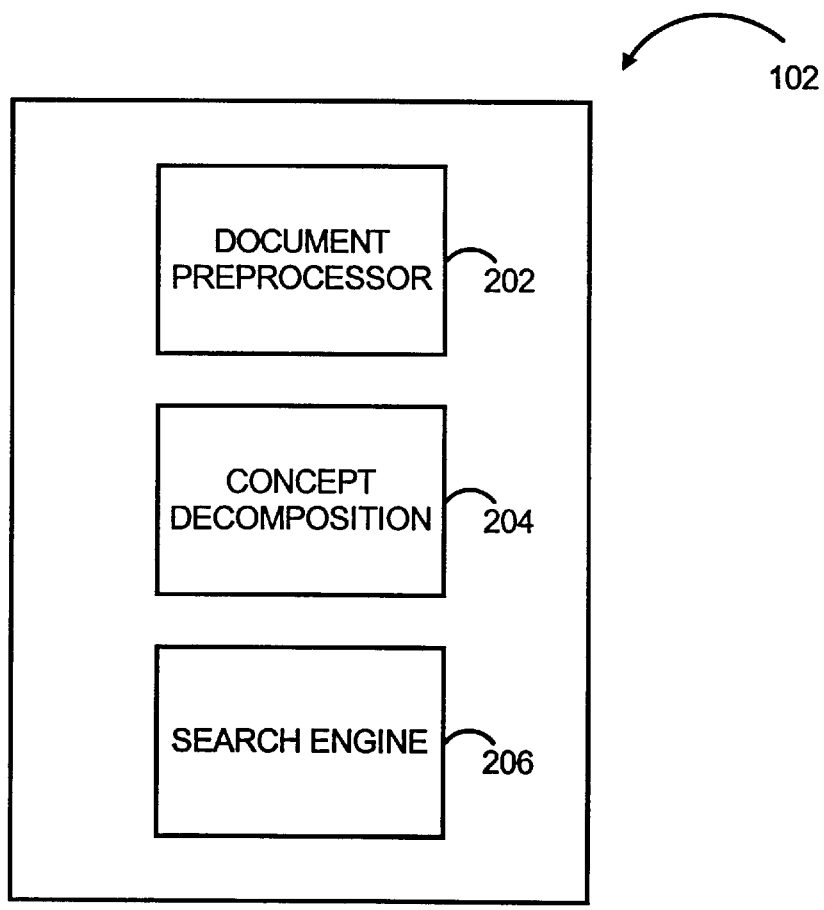
FIG. 2 is a representation of the document processor illustrated in FIG. 1.

FIG. 2 illustrates the components of the document processor 102, and shows that the preferred embodiment includes a document preprocessor 202, a concept decomposition unit 204, and a search engine 206. The document preprocessor 202 parses the text documents to reduce redundant words and forms word frequency counts associated with each document. The concept decomposition unit 204 performs concept decomposition in accordance with the invention, as described more fully below. Thus, the concept decomposition unit produces a reduced dimension representation of the text documents. The search engine 206 can be used for text searching on the reduced dimensionality text documents, which can then be used to retrieve original documents from the repository 104. Each of the three components (the document preprocessor 202, the concept decomposition unit 204, and the search engine 206) can be implemented in one or more separate computers, or can all be implemented within a single computer data processing system.

The preprocessor 202 preferably ignores alphabetical case (capitalization) in parsing, and identifies or extracts all unique words from the set of text documents before processing by the concept decomposition unit 204. In addition, the preprocessor eliminates words that are not content-bearing, such as conjunctions ("and", "or"), articles ("a", "the"), and other "stopwords" that are well-known to those skilled in the art. For each text document, the preprocessor counts the number of occurrences of each word. If desired, the preprocessor also can eliminate words known as "function" words, which are not considered content-bearing. These words can be identified with heuristic or information-theoretic criteria known to those skilled in the art. In addition, the preprocessor 202 can reduce certain words to root or stem phrases, thereby eliminating plural forms, tenses, prefixes, and suffixes. After such preprocessing is completed, each text document should contain a certain number of unique words. A unique number is then assigned to each word in the entire text document collection. Each document also is identified with a unique identifier. Thus, each unique document in the collection is numbered, and each unique word in the collection is numbered. This defines the dimensionality of the document vector space. Word frequency data also is computed for the processed document collection.

Figure 3:
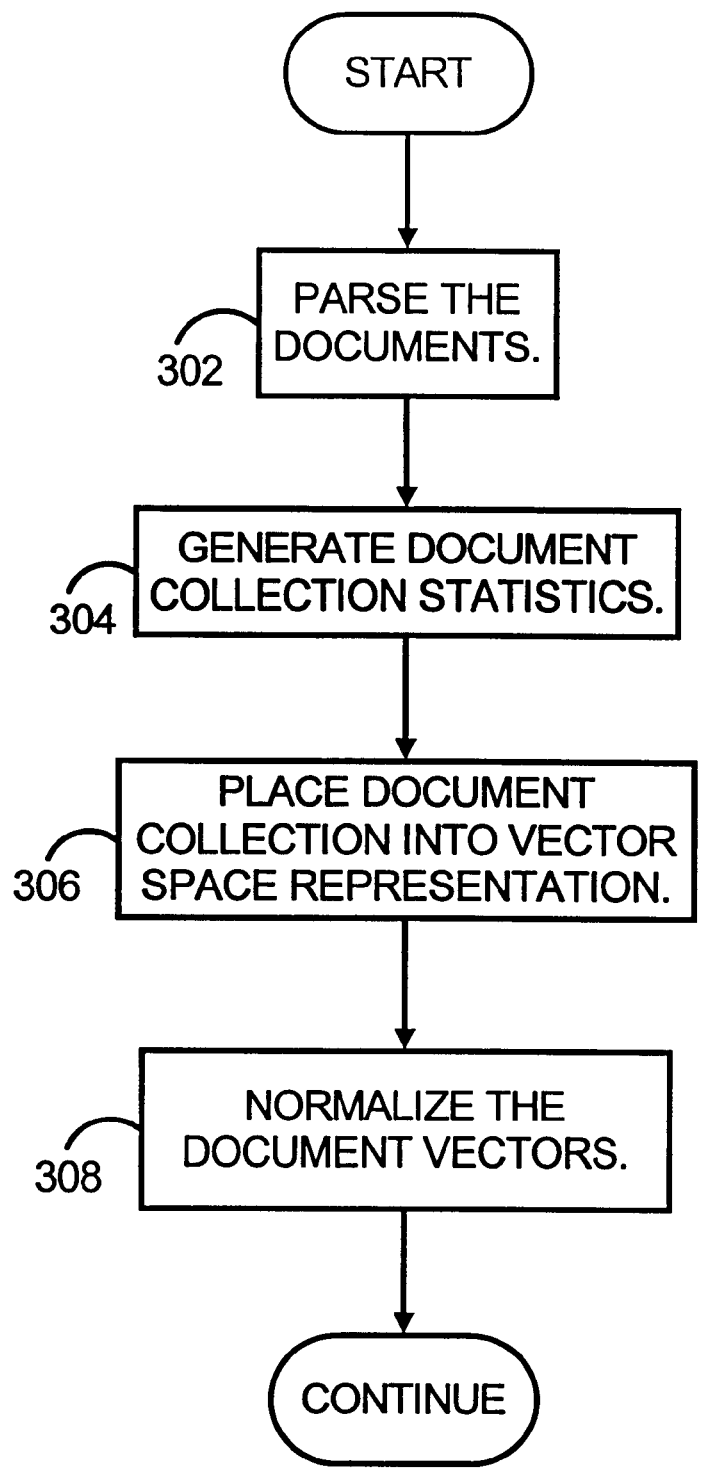
FIG. 3 is a flow diagram that illustrates the processing steps executed by the document preprocessor of FIG. 2.

FIG. 3 illustrates the processing operations executed by the document preprocessor 202 of the preferred embodiment. In the first operation, represented by the flow diagram box numbered 302, the document preprocessor parses the documents, reducing non-content words as described above. Next, the preprocessor generates various statistics for the document collection, such as word frequencies and word counts. This operation is represented by the flow diagram box numbered 304. The preprocessor then places the parsed document collection into vector space representation, as indicated by the flow diagram box numbered 306. The preprocessor then normalizes the document vectors, indicated by the flow diagram box numbered 308. This operation will be readily understood by those skilled in the art. As noted above, any one or all of these operation steps can be performed by a single computer, or the operations can be divided between the document preprocessor and document processing unit, or some other desired division among computers of the processing system 100 (FIG. 1).

Figure 4:
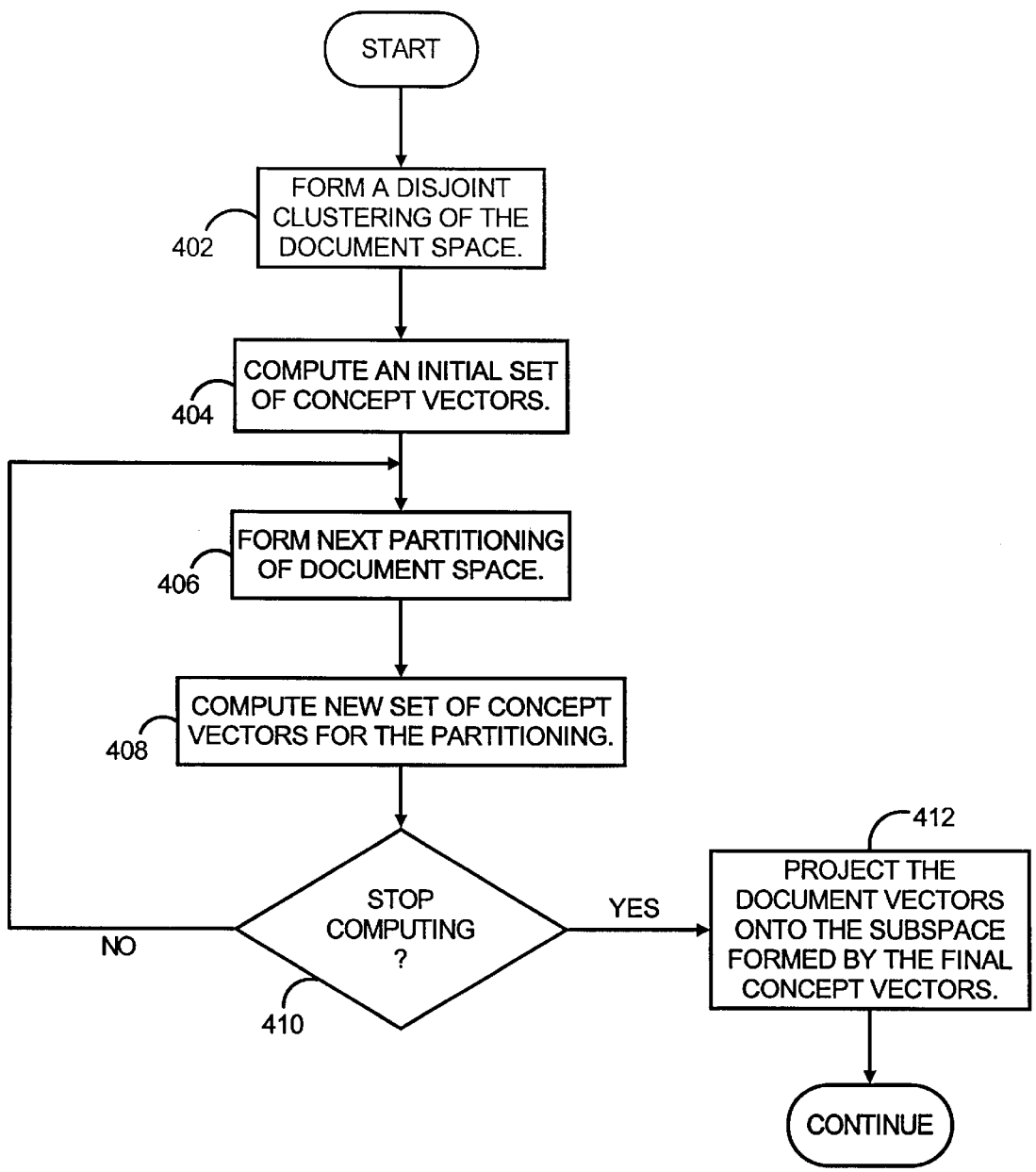
FIG. 4 is a flow diagram that illustrates the processing steps executed by the concept decomposition unit of FIG. 2 to implement the document representation technique in accordance with the present invention.

FIG. 4 is a flow diagram that illustrates the processing operations performed by the concept decomposition unit 204 (FIG. 2) to implement the document representation technique in accordance with the present invention. In the first processing step, represented by the flow diagram box numbered 402, a disjoint clustering of the preprocessed document space is performed by the concept decomposition unit. The disjoint clustering may be achieved, for example, by dividing the document vector space into a uniform distribution of equal-sized partitions along the document dimension index, or by arbitrarily selecting a number of partitions and randomly assigning documents to partitions. As noted above, for example, the document space may comprise a 100K×100K matrix space (100K documents with 100K different words).

The partitioning of the vector document space may be represented in set notation by Equation (1) below.

Equation (1):

$$\bigcup_{j=1}^{k} \pi_j = x_1, x_2, \ldots, x_n,$$

where $\pi_j \neq \pi_l$ if $j \neq l$, and there are n preprocessed document vectors x, and the set $\pi_1, \pi_2, \ldots, \pi_k$ denotes the partitioning of the document vectors into k disjoint clusters.

Thus, if there are 100K different documents in the document collection, then the initial partition may comprise one thousand "bins" or partitions of one thousand documents each, so that the first thousand documents are assigned to the first bin, the second thousand documents are assigned to the second bin, and so on. Each of these one thousand partitions will have 1K ×100K elements, the 1K dimension for the thousand documents in each partition, and the 100K dimension for the 100K words in the text collection. Because the document vector space is normalized, the vector representation length of each document should not be a factor in the partitioning. Nevertheless, other alternative partitioning schemes will occur to those skilled in the art, including random assignment of documents to partitions. It should be understood that there will be a variety of schemes for selecting the number of partitions. Although the number of partitions is arbitrary, it is anticipated that the number of partitions will be selected in accordance with the computing resources available and the desired granularity (dimension reduction) of the final document space, as described further below.

In the next decomposition processing operation, the concept decomposition unit computes an initial set of concept vectors for the partitioning, comprising the mean vector in each partition for the set of document vectors placed in the partition. This operation is represented by the flow diagram box numbered 404. Thus, if the first one thousand document vectors are placed in the first partition, then the mean value of the thousand vectors for each document in the first partition of the document collection determines the initial concept vector for that partition. In accordance with the initial 1K×100K partitioning, each of the initial concept vectors will have dimensionality of 1×100K. In the preferred embodiment, a merit of partition quality is computed, as described further below. For a given initial partition, this quality figure may be easily determined.

A concept vector is determined by computing the vector $m_j$, which is also called the mean vector or centroid vector m of the jth cluster, as given by Equation (2) below:

Equation (2):

$$m_j = \frac{1}{n_j} \sum_{\pi_j} x,$$

for all $x \in \pi_j$, where $n_j$ is the number of document vectors in the document vector space. In accordance with the invention, the concept vectors are unit vectors. Therefore, the computed mean vectors $m_j$ are normalized, thereby providing the unit concept vectors $c_j$ given by Equation (3) below.

Equation (3):

$$c_j = \frac{m_j}{\|m_j\|}.$$

Those skilled in the art will appreciate that the concept vector $c_j$ may be characterized as the vector that is closest in cosine similarity to all the document vectors in a cluster $\pi_j$.

After the initial set of concept vectors is computed, the system forms a new partitioning of the document vector space, as indicated by the flow diagram box numbered 406. That is, for each document vector $x_i$, the concept decomposition unit will find the concept vector closest to the $x_i$ and then will compute a new partitioning, so that for an initial (t) partitioning $\pi_j^{(t)}$, there will be a new (t+1) partitioning $\pi_j^{(t+1)}$ where the set $\pi_j^{(t+1)}$ is the set of document vectors that are closest to the concept vector $c_j^{(t)}$, and where t denotes the iteration index of the partitioning process. Once the new partitioning $\pi_j^{(t+1)}$ is fixed, the concept decomposition unit calculates a corresponding new set of concept vectors $c_j^{(t+1)}$ for the vector space. Computing the new set of concept vectors is represented by the flow diagram box numbered 408. This operation is executed in the same fashion as described above for the computation of the initial set of concept vectors, by finding the mean vector of each partition and normalizing.

The concept decomposition unit then checks for a stopping criteria, as indicated by the decision box numbered 410. The stopping criteria may comprise, for example, the magnitude of the change in concept vector from one iteration to another, or it may comprise a predetermined number of iterations or computation time. Thus, the concept decomposition unit may compare the set of concept vectors $c_j^{(t+1)}$ against the previous set $c_j^{(t)}$, comparing magnitude of change between the two. If no stopping is indicated, represented by a negative outcome at the decision box 410, then iteration continues at the box 406 for forming the next partition of the document space and computing a new set of concept vectors.

If a stopping criteria is met, an affirmative outcome at the decision box 410, then the iteration is stopped and processing proceeds to determining a new representation of the document space, as indicated by the flow diagram box numbered 412. The processing 412 is to project the document vectors onto the subspace formed by the final iteration set of concept vectors. Those skilled in the art will understand that this operation may be implemented by representing each original document vector received from the text repository as a linear combination of the final iteration concept vectors. The concept vectors span the concept subspace and span at least a part of the document space. The number of concept vectors will determine how much of the document space is spanned, and therefore will determine the amount of approximation error. A greater number of concept vectors reduces the error.

As noted above, for a text collection of 100K documents with 100K words, a set of concept vectors may be chosen to comprise a set of 1K vectors. Thus, the original 100K×100K vector space of documents may be represented by the 1K set of concept vectors rather than the 100K different words, changing the vector space of documents into 100K documents by 1K unit vectors, a 100K×1K vector space. In this way, the system provides significant dimensionality reduction, thereby improving efficiency of storage, retrieval, and searching operations.

After the document vectors have been projected onto the concept vector subspace, other operations of the system may continue. The other operations may include, for example, searching for text strings based on the projected vector space rather than the original text repository documents. Thus, an operation over a 100K×100K vector space can be replaced with an operation over a 1K×100K vector space. Therefore, the operation 412 may include receiving a search query and then performing text searching and retrieval operations on the projected vector space, which may then be used to identify complete documents in the text data repository for full retrieval. The search engine 206 (FIG. 2) may be used for this purpose.

Figure 5:
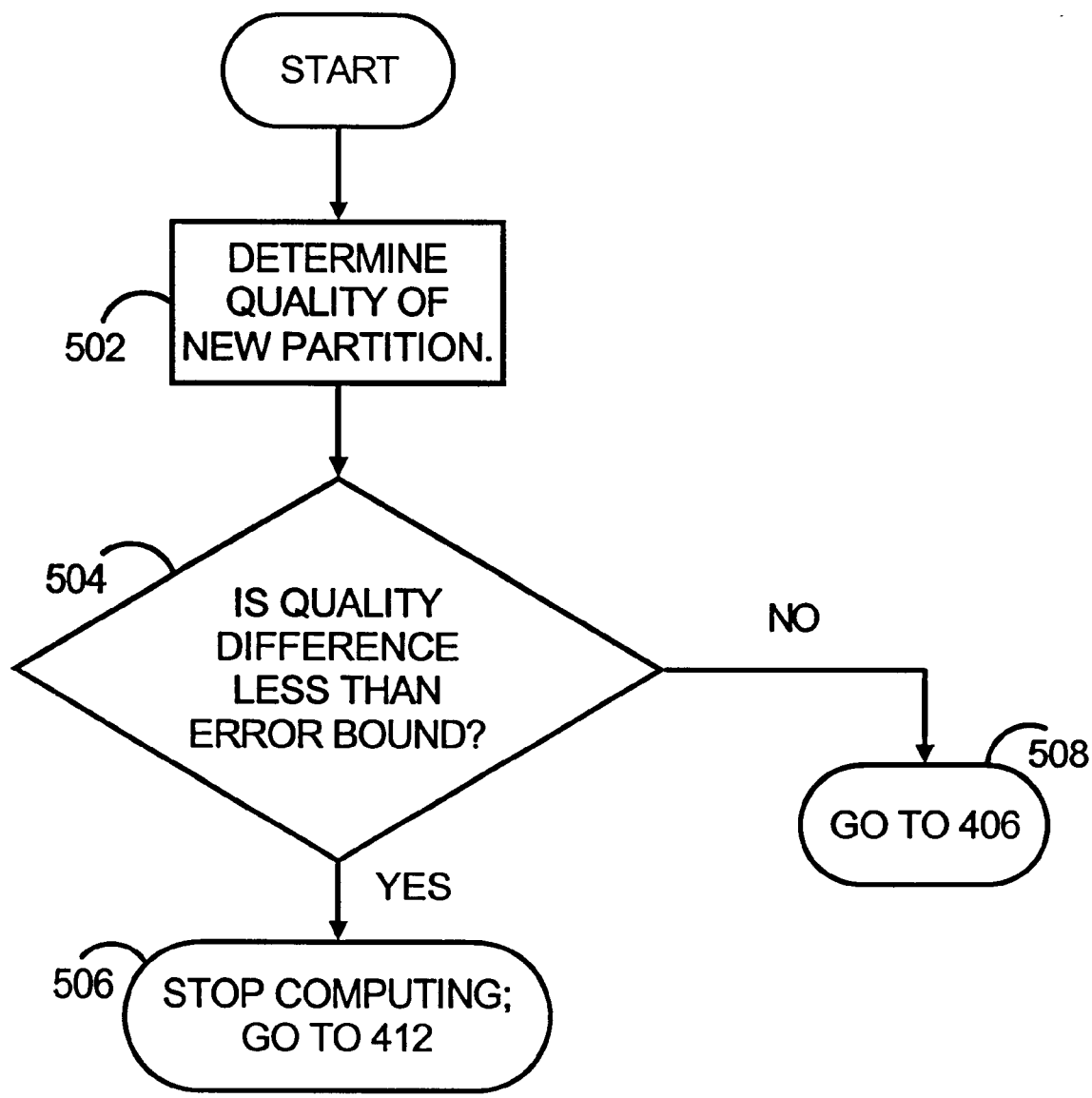
FIG. 5 is a flow diagram that illustrates the processing steps executed by the computer to perform the concept vector computation stopping criterion of FIG. 4.

As noted above, a variety of error bound conditions may be employed. FIG. 5 illustrates details of determining whether the error stopping criteria of the FIG. 4 decision box 410 has been met. The first operation, represented by the FIG. 5 flow diagram box numbered 502, is to determine a quality merit for the new partition. The details of this computation are the same as applied to the initial partition (box 404). In the preferred embodiment, the quality of a partition is given by an objective function that measures the combined coherence of all k clusters in a partition. The objective function is given by Equation (4) below.

Equation (4):

$$Q[(\pi_j)_{j=1}^k] = \sum_{j=1}^k \sum_{x \in (\pi_j)} x^T c_j,$$

where Q is the quality merit function, the $\pi_j$ is a given partition of k clusters, x is the set of document vectors, and c is the corresponding set of concept vectors.

In the next operation, the concept decomposition unit will compare the quality function value for a current concept vector iteration with the quality function for the previous (or the initial) concept vector iteration. This comparison is represented by the decision box numbered 504, and may be written as Equation (5) below for a current partition $\pi_j^{(t+1)}$ and a prior partition $\pi_j^{(t)}$.

Equation (5):

$$|Q[(\pi_j^{(t)})_{j=1}^k] - Q[(\pi_j^{(t+1)})_{j=1}^k]| \leq \varepsilon$$

where $\varepsilon > 0$. Equation (5) implements the criterion to stop iterating and computing new concept vectors if the change in the quality function Q is less than a predetermined error bound $\varepsilon$.

Experimental results obtained in systems constructed in accordance with the present invention show that the novel technique is quite effective at dimensionality reduction and yields results commensurate with the initial partitioning of the document vector space. In particular, it has been found that randomly assigning each document to one of the k clusters provides satisfactory results. Alternatively, an "overall" concept vector may be first computed for the entire document collection, and the k initial concept vectors may then be obtained by randomly perturbing the overall concept vector, using a corresponding "Voronoi" partitioning that will be known to those skilled in the art. The initial set may also be obtained by attempting multiple arbitrary initial partitionings, computing the quality function for each, and then selecting the partitioning that provides the greatest quality function value as the initial partitioning.

As noted above, the final operation in concept decomposition may be an operation that represents the document vectors as a linear combination of the final set of concept vectors (box 412 of FIG. 4). Those skilled in the art will understand how to project the document vector space onto the concept vector subspace using techniques such as least squares approximation, QR decomposition, and the like. A matrix x' that represents the document vectors will typically incur some amount of approximation error when compared with the original source documents. The matrix approximation error may be provided by Equation (6).

Equation (6):

$$\|x - x_k'\|_F^2 = \sum_{j=1}^k \sum_{x \in (\pi_j)} \|x - c_j\|^2,$$

which employs the computation of the "Frobenius" norm of the difference matrix. The Frobenius norm will be known to those skilled in the art. Thus, for any partitioning of the document vector space x, where there are k clusters or partitions, the corresponding matrix approximation x' will have rank k, thereby achieving a potentially significant dimensionality reduction with a readily determinable error. The approximation error represents the information thrown away by the projection operation.

An indexing technique well-known in the field of information retrieval is that of singular value decomposition (SVD). The SVD technique unfortunately requires extensive computation resources, though it is reputed to achieve among the best (least error) document decomposition results obtainable with present computation techniques. Experimental results obtained using the present invention concept decomposition technique, with the same number of clusters or partitioning of the document space, shows that good results are obtained with the present system as compared with SVD.

Figure 6:
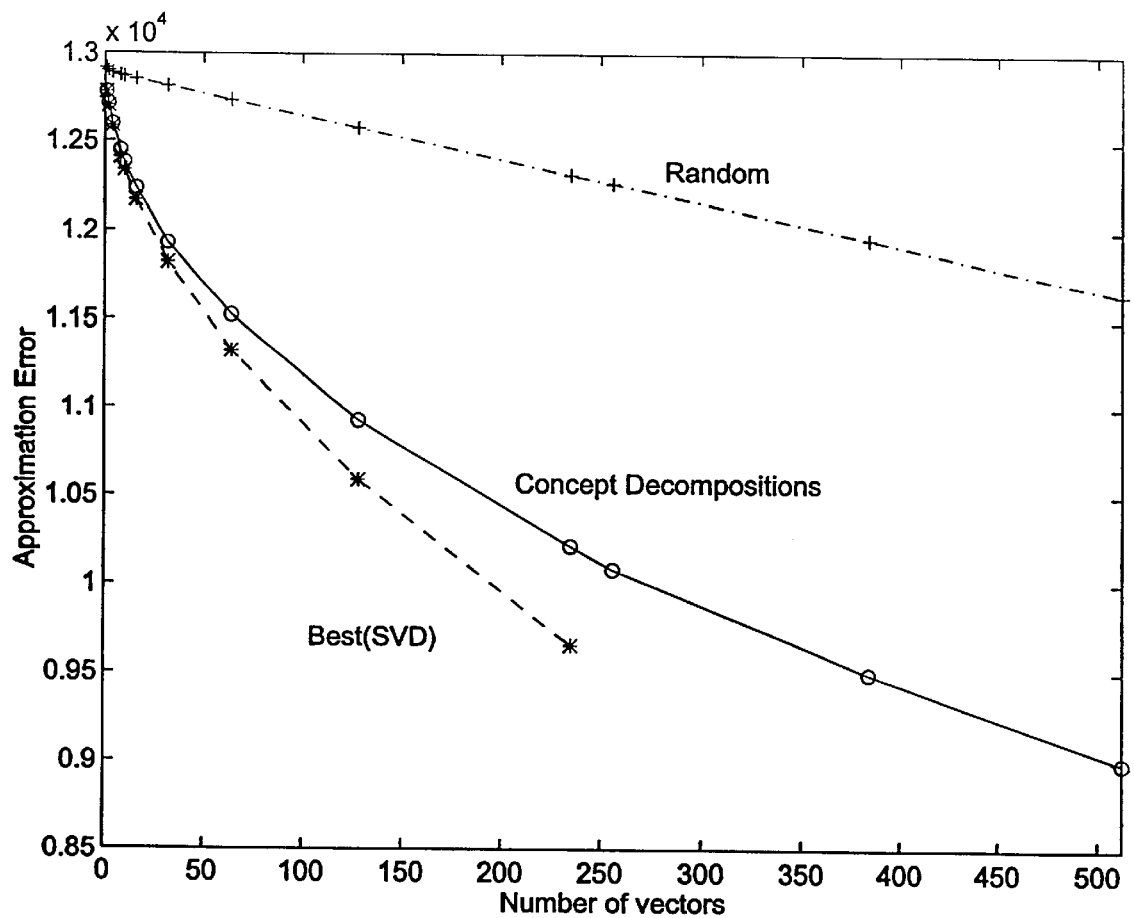
FIG. 6 is a graphical representation of approximation error for the concept decomposition of the present invention and the conventional singular value decomposition (SVD) technique.

FIG. 6 shows graphical results for concept decomposition using the present invention with an IBM Corp. "RS6000" computer system having 256M bytes of memory. The vertical axis of the FIG. 6 graph shows approximation error, and the horizontal axis shows the number of vectors (or cluster partitions) for the SVD technique and for the novel technique of the invention. It can be seen that approximation error is reduced with an increasing number of cluster vectors. It should be appreciated that the "RS6000" computer system could only accommodate the SVD technique for up to 235 singular vectors before exhausting the memory capacity, whereas the concept decomposition technique of the present invention could easily accommodate more than 500 vectors, thereby eventually achieving superior error performance with the same resources. Alternatively, equivalent performance may be obtained with lesser resources, as compared with SVD techniques.

As noted above, the concept decomposition technique of the present invention may be implemented on a wide variety of computing systems for implementing the document processor system described above. Moreover, the text repository may transfer documents to the document processor over a variety of connections, including local area and wide area networks such as the well-known Internet system. Therefore, those skilled in the art will appreciate that the document processor may comprise single or multiple computers, so that the document preprocessor, concept decomposition unit, and search engine can reside on the same computer or can reside on different computers, all of which can have a similar computer construction.

Figure 7:
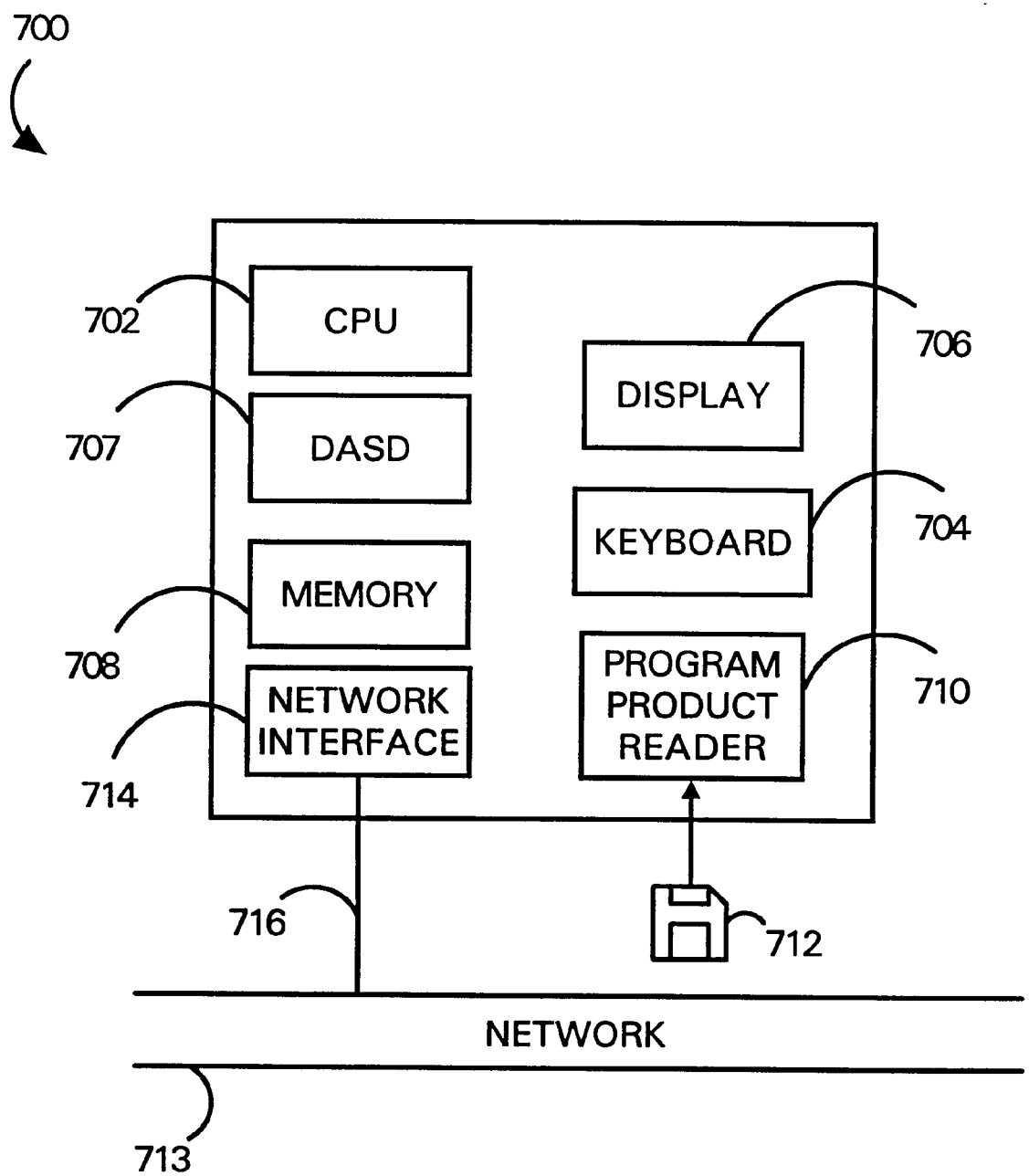
FIG. 7 is a block diagram of a computer in the system illustrated in FIG. 1.

FIG. 7 is a block diagram of an exemplary computer 700 such as might comprise any of the computers 202, 204, 206. Each computer 700 operates under control of a central processor unit (CPU) 702, such as a "Pentium" microprocessor and associated integrated circuit chips, available from Intel Corporation of Santa Clara, Calif., USA. A computer user can input commands and data from a keyboard 704 and can view inputs and computer output at a display 706. The display is typically a video monitor or flat panel display. The computer 700 also includes a direct access storage device (DASD) 707, such as a hard disk drive. The memory 708 typically comprises volatile semiconductor random access memory (RAM). Each computer preferably includes a program product reader 710 that accepts a program product storage device 712, from which the program product reader can read data (and to which it can optionally write data). The program product reader can comprise, for example, a disk drive, and the program product storage device can comprise removable storage media such as a magnetic floppy disk, a CD-R disc, or a CD-RW disc. Each computer 700 can communicate with the others over a network 713 through a network interface 714 that enables communication over a connection 716 between the network and the computer.

The CPU 702 operates under control of programming steps that are temporarily stored in the memory 708 of the computer 700. When the programming steps are executed, the document processor performs its functions. The programming steps can be received from the DASD 707, through the program product storage device 712, or through the network connection 716. The storage drive 710 can receive a program product 712, read programming steps recorded thereon, and transfer the programming steps into the memory 708 for execution. As noted above, the program product storage device can comprise any one of multiple removable media having computer-readable instructions, including floppy disks and CD storage. Other suitable program product storage devices can include magnetic tape and semiconductor memory. In this way, the processing steps necessary for operation in accordance with the invention can be embodied on a program product. Alternatively, the program steps can be received into the operating memory 708 over the network 713. In the latter method, the computer receives data into the memory 708 through the network interface 714 after network communication has been established over the network connection 716 by well-known methods that will be understood by those skilled in the art without further explanation.

It should be understood that all of the computers 202, 204, 206 of the document processor system illustrated in FIG. 2 have a construction similar to that shown in FIG. 7, so that details described with respect to the FIG. 7 computer 700 will be understood to apply to all computers of the system 102. Alternatively, any of the computers 202, 204, 206 can have an alternative construction, so long as they can communicate with the text data repository and support the functionality described herein.

The present invention has been described above in terms of a presently preferred embodiment so that an understanding of the present invention can be conveyed. There are, however, many configurations for document processing systems not specifically described herein but with which the present invention is applicable. The present invention should therefore not be seen as limited to the particular embodiment described herein, but rather, it should be understood that the present invention has wide applicability with respect to document processing systems generally. All modifications, variations, or equivalent arrangements and implementations that are within the scope of the attached claims should therefore be considered within the scope of the invention.

We claim:

1. A method of operating a computer system to represent text documents stored in a database collection, comprising:
   representing the text documents in a vector representation format in which there are n documents and d words;
   normalizing the document vectors;
   determining an initial partitioning of the normalized document vectors comprising a set of k disjoint clusters and determining k cluster vectors, wherein a cluster vector comprises a mean vector of all the normalized document vectors in a partition;
   computing a set of K concept vectors based on the initial set of cluster vectors, wherein the concept vectors define a subspace of the document vector space and wherein the subspace spans a part of the document vector space; and
   projecting each document vector onto the subspace defined by the concept vectors, thereby defining a set of document concept decomposition vectors that represent the document vector space, with a reduced dimensionality.

2. A method as defined in claim 1, wherein computing a set of k concept vectors comprises:
   determining the mean vector of the normalized document vectors in each disjoint cluster;
   determining the closest concept vector to each normalized document vector in the document vector space;
   assigning each of the normalized document vectors to a partition defined by the determined closest concept vector; and
   repeating the computing, determining, and assigning operations up to a predetermined stopping threshold, thereby defining a vector subspace that spans the document vector space.

3. A method as defined in claim 2, wherein projecting onto the subspace comprises representing each document vector as a linear combination of the concept vectors.

4. A method as defined in claim 2, wherein the predetermined stopping threshold comprises a metric describing the amount of information thrown away by the projection operation.

5. A method as defined in claim 1, wherein the initial set of k disjoint cluster vectors comprises a set of vectors uniformly distributed in the normalized document vector space.

6. A method as defined in claim 1, wherein the initial set of k disjoint cluster vectors comprises a set of vectors randomly distributed in the normalized document vector space.

7. A method as defined in claim 1, further including:

receiving a search query relating to content of the text documents;

performing a search on the projected document vectors for the received query; and identifying text documents that correspond to the search query.

8. A computer system that processes text documents to produce a document database representation, the system comprising:

a Text Data Repository that contains the text documents; and a Document Processor that processes the text documents and is adapted to represent the text documents in a vector representation format in which there are n documents and d words, normalize the document vectors, to determine an initial partitioning of the normalized document vectors comprising a set of k disjoint clusters and determining k cluster vectors, wherein a cluster vector comprises a mean vector of all the normalized document vectors in a partition, then to compute a set of k concept vectors based on the initial set of cluster vectors, wherein the concept vectors define a subspace that spans the document vector space, and then to project each document vector onto the subspace defined by the concept vectors, thereby defining a set of document concept decomposition vectors that represent the document vector space, with a reduced dimensionality.

9. A system as defined in claim 8, wherein the Document Processor computes a set of k concept vectors by:

determining the mean vector of the normalized document vectors in each disjoint cluster;

determining the closest concept vector to each normalized document vector in the document vector space;

assigning each of the normalized document vectors to a partition defined by the determined closest concept vector; and repeating the computing, determining, and assigning operations up to a predetermined stopping threshold, thereby defining a vector subspace that spans a part of the document vector space.

10. A system as defined in claim 9, wherein the Document Processor projects onto the subspace by representing each document vector as a linear combination of the concept vectors.

11. A system as defined in claim 9, wherein the predetermined stopping threshold comprises a metric describing the amount of information thrown away by the projection operation.

12. A system as defined in claim 8, wherein the initial set of k disjoint cluster vectors comprises a set of vectors uniformly distributed in the normalized document vector space.

13. A system as defined in claim 8, wherein the initial set of k disjoint cluster vectors comprises a set of vectors randomly distributed in the normalized document vector space.

14. A system as defined in claim 8, further including a search engine that is adapted to receive a search query relating to content of the text documents, perform a search on the projected document vectors for the received query, and identify text documents that correspond to the search query.

15. A program product having a signal-bearing medium tangibly embodying a program of machine-readable instructions executable by a digital processing apparatus to perform a method of representing text documents stored in a database collection, the performed method comprising:

representing the text documents in a vector representation format in which there are n documents and d words;

normalizing the document vectors;

determining an initial partitioning of the normalized document vectors comprising a set of k disjoint clusters and determining k cluster vectors, wherein a cluster vector comprises a mean vector of all the normalized document vectors in a partition;

computing a set of K concept vectors based on the initial set of cluster vectors, wherein the concept vectors define a subspace of the document vector space and wherein the subspace spans a part of the document vector space; and projecting each document vector onto the subspace defined by the concept vectors, thereby defining a set of document concept decomposition vectors that represent the document vector space, with a reduced dimensionality.

16. A program product as defined in claim 15, wherein computing a set of k concept vectors comprises:

determining the mean vector of the normalized document vectors in each disjoint cluster;

determining the closest concept vector to each normalized document vector in the document vector space;

assigning each of the normalized document vectors to a partition defined by the determined closest concept vector; and repeating the computing, determining, and assigning operations up to a predetermined stopping threshold, thereby defining a vector subspace that spans a part of the document vector space.

17. A program product as defined in claim 16, wherein projecting onto the subspace comprises representing each document vector as a linear combination of the concept vectors.

18. A program product as defined in claim 16, wherein the predetermined stopping threshold comprises a metric describing the amount of information thrown away by the projection operation.

19. A program product as defined in claim 15, wherein the initial set of k disjoint cluster vectors comprises a set of vectors uniformly distributed in the normalized document vector space.

20. A program product as defined in claim 15, wherein the initial set of k disjoint cluster vectors comprises a set of vectors randomly distributed in the normalized document vector space.

21. A program product as defined in claim 15, wherein the performed method further includes:

receiving a search query relating to content of the text documents;

performing a search on the projected document vectors for the received query; and identifying text documents that correspond to the search query.

22. A computer system that processes text documents to produce a document database representation, the system comprising:

a Text Data Repository that contains the text documents; and a Document Processor that processes the text documents and is adapted to represent the text documents in a vector representation format in which there are n documents and d words, normalize the document vectors, to determine an initial partitioning of the normalized document vectors comprising a set of k disjoint clusters and determining k cluster vectors, wherein a cluster vector comprises a mean vector of all the normalized document vectors in a partition, then to compute a set of k concept vectors based on the initial set of cluster vectors;

wherein the Document Processor computes a set of k concept vectors by:
determining the mean vector of the normalized document vectors in each disjoint cluster;
determining the closest concept vector to each normalized document vector in the document vector space;
assigning each of the normalized document vectors to a partition defined by the determined closest concept vector; and
repeating the computing, determining, and assigning operations up to a predetermined stopping threshold, thereby defining a vector subspace that spans a part of the document vector space;

and wherein the Document Processor projects each document vector onto the subspace defined by the concept vectors, thereby defining a set of document concept decomposition vectors that represent the document vector space, with a reduced dimensionality.

23. A system as defined in claim 22, wherein the Document Processor projects onto the subspace by representing each document vector as a linear combination of the concept vectors.

24. A system as defined in claim 22, wherein the predetermined stopping threshold comprises a metric describing the amount of information thrown away by the projection operation.

25. A system as defined in claim 22, wherein the initial set of k disjoint cluster vectors comprises a set of vectors uniformly distributed in the normalized document vector space.

26. A system as defined in claim 22, wherein the initial set of k disjoint cluster vectors comprises a set of vectors randomly distributed in the normalized document vector space.

27. A system as defined in claim 22, further including a search engine that is adapted to receive a search query relating to content of the text documents, perform a search on the projected document vectors for the received query, and identify text documents that correspond to the search query.

* * * * *